E. M. LANG, Jr.
PROCESS OF MAKING SOLDER RINGS.
APPLICATION FILED DEC. 11, 1907.
978,040.
Patented Dec. 6, 1910.
2 SHEETS—SHEET 1.
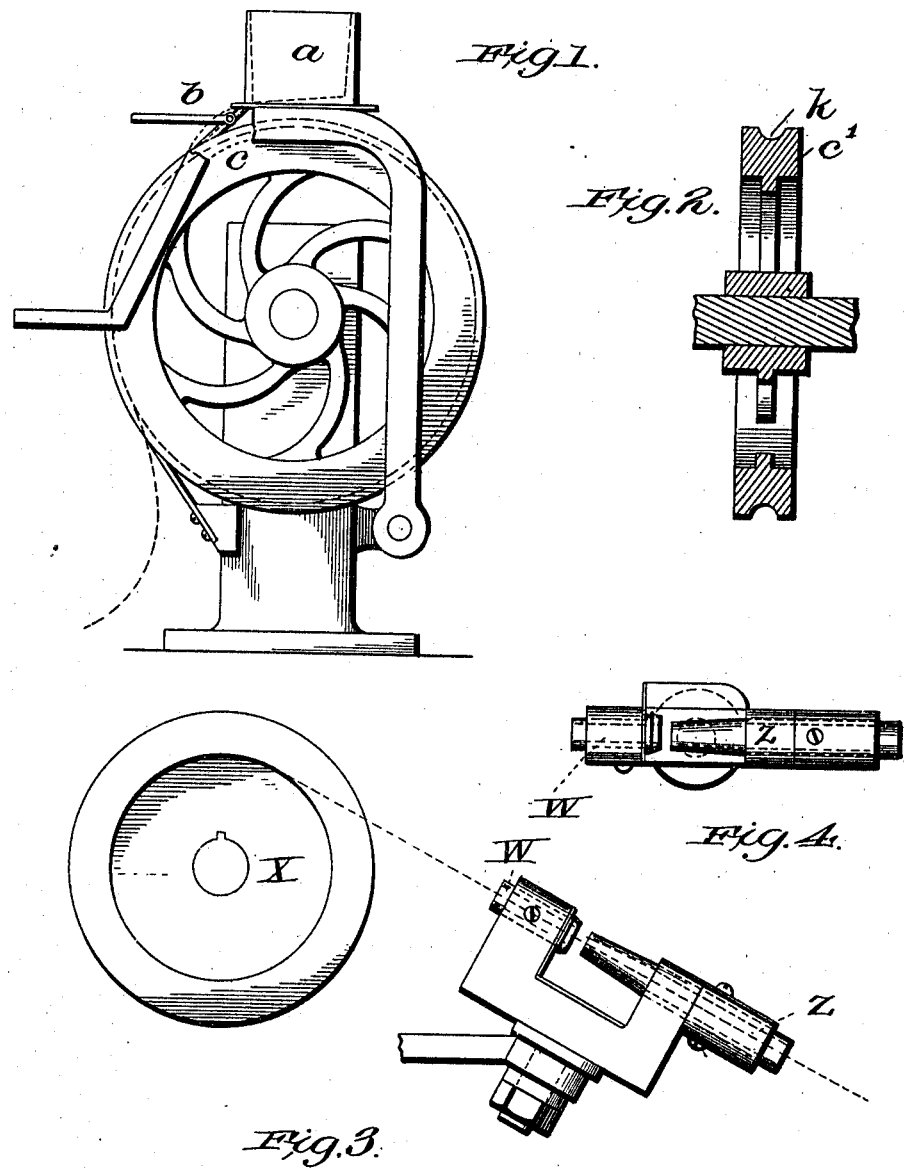

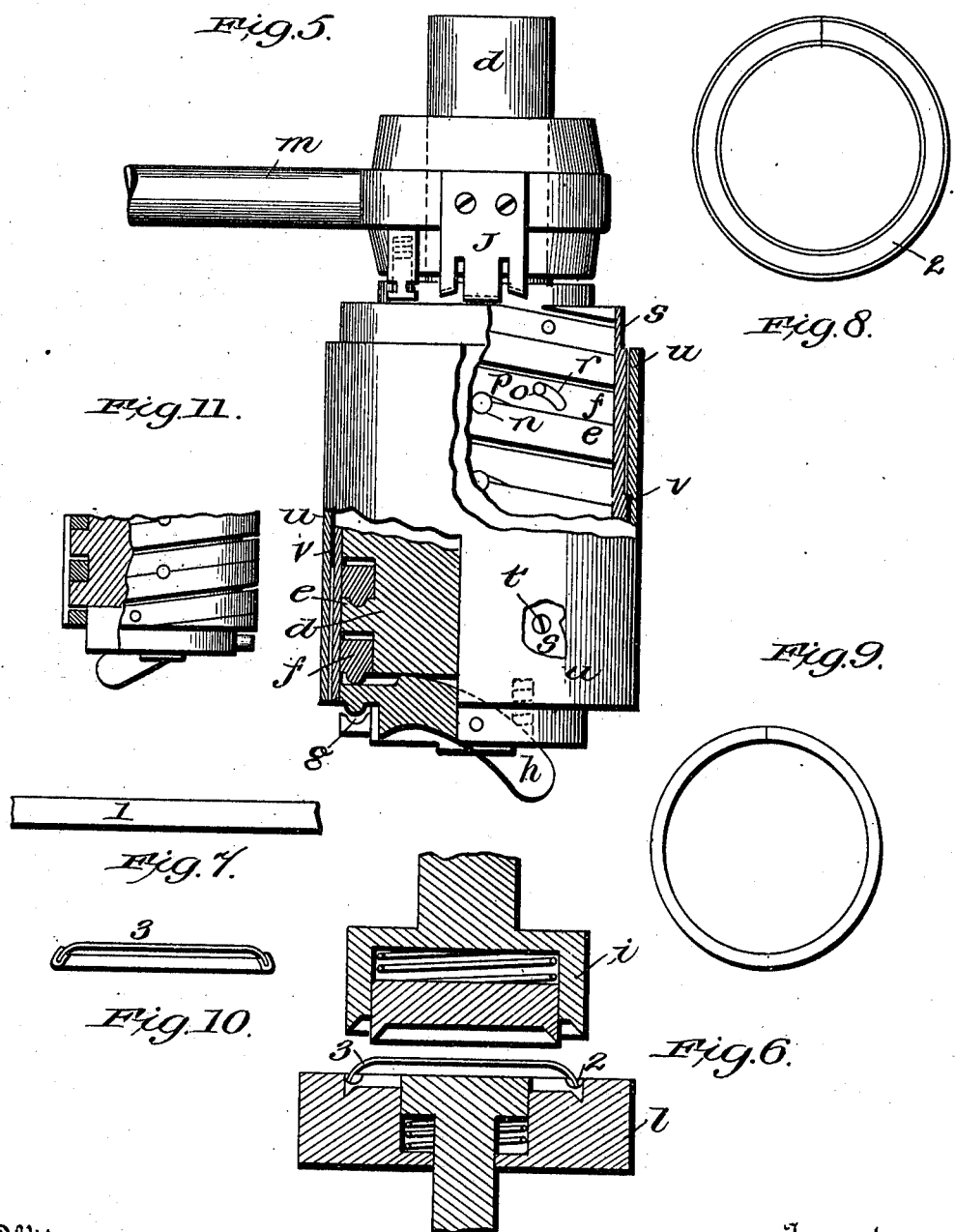

UNITED STATES PATENT OFFICE.

EDWARD M. LANG, JR., OF PORTLAND, MAINE.

PROCESS OF MAKING SOLDER RINGS.

978,040. Specification of Letters Patent. Patented Dec. 6, 1910.

Original application filed October 19, 1904, Serial No. 229,068. Divided and this application filed December 11, 1907. Serial No. 406,118.

*To all whom it may concern:*

Be it known that I, EDWARD M. LANG, Jr., a citizen of the United States, residing at Portland, Cumberland county, Maine, have invented certain new and useful Improvements in Processes of Making Solder Rings; and I do hereby declare the following to be a full, clear, and exact description of the invention, such as will enable others skilled in the art to which it appertains to make and use the same.

My invention relates to the process of making solder rings, and this application is a division of my former Patent No. 905,891, dated December 8, 1908.

Heretofore the rings of solder used for hemming caps, have been made from sheet metal, the sheet metal being subjected to the action of a succession of dies, whereby a flat annulus is cut from the sheet, this annulus then being hemmed upon the cap. This process leaves a very large amount of refuse solder which must either be worked over or lost, and by my process the same result is obtained without loss of material and without expense in re-working refuse material.

In the accompanying drawings, which represent an apparatus for carrying out my process—Figure 1 is a side elevation of the mechanism by which the strip or ribbon of solder may be produced. Fig. 2 is a transverse vertical section of the wheel shown in Fig. 1, with a recess in its periphery. Fig. 3 is a side elevation of the spool and of the device which may be used to reduce the ribbon of solder to uniform thickness and width. Fig. 4 is a top plan view of the device, shown in Fig. 3. Fig. 5 is a side elevation of the mechanism whereby the strip or ribbon of solder may be converted into a curved split ring. Fig. 6 is a transverse section of the die whereby the ring is folded or hemmed upon the can cap. Fig. 7 shows the ribbon of solder. Fig. 8 shows a split curved ring of solder. Fig. 9 shows a split flat ring of solder. Fig. 10 is a side elevation of the completed cap, hemmed with solder, and Fig. 11 is a view, partially in section, of a mechanism similar to that shown in Fig. 5, except that a spiral rectangular in cross section is produced.

Briefly, my invention consists in producing a strip or ribbon of solder of the desired uniform thickness and width, forming therefrom a ring preferably curved in cross section from the center outward and hemming said ring upon a can cap.

In my invention above referred to, the narrower claims are limited to forming a flat ribbon of solder, uniform in cross section, grooving said ribbon in the direction of its length, and cutting therefrom a ring.

By the present application I desire to cover the process of making a solder ring which consists in forming a strip or ribbon of solder of uniform size, bending the same edgewise, and severing the ring therefrom. This ribbon or strip or the ring formed therefrom may be grooved in the direction of its length at any desired time.

The strip or ribbon of solder may be formed by various means, as shown in Figs. 1 and 2. The solder is melted in the vessel *a*, or poured into said vessel in a molten condition, this vessel *a* being kept hot and being provided with a suitable valve *b* through which the melted solder is allowed to flow upon the surface of the revolving wheel *c*. The wheel *c* may have a plain surface or it may be cut away leaving a groove in which a flat ribbon of solder may be cast, as shown in dotted lines in Fig. 1, this groove being of the desired width of the strip or ribbon to be cast.

In Fig. 2, the wheel *c* is provided with a groove, and its periphery curved in cross section, by means of which a wire, circular in cross section, may be produced, or a half wire, or a wire crescent shaped in cross section, according to the shape of the outlet and velocity of flow through said outlet and the speed of revolution of the wheel *c*. For example, if the outlet is circular and the wheel *c* revolves very slowly, a practically round wire will be produced. If the speed of the wheel *c* is increased, a half round wire will be produced, and if the speed of said wheel is increased still further, a strip crescent shaped in cross section will be produced.

As the ribbon or strip of solder is produced, it may be carried directly into the mechanism, whereby it is converted into a grooved spiral split ring 2, said mechanism being shown in Fig. 5, and consisting of a mandrel *d* provided with a spiral *e* rigidly fixed to its surface, the upper surface of the spiral being of a curvature similar to that which it is desired to produce in the ribbon, said mechanism being also provided with a loose spiral $f$ likewise surrounding said mandrel. The underside of the spiral $f$ is grooved to correspond to the fixed spiral, and means, including the bar $m$, which may be operated by hand or by power, are provided whereby the mandrel may be oscillated. Means are also provided namely, the pins $n$ and $o$ and the slots $p$ and $r$, whereby at each alternate oscillation the spirals $e$ and $f$ are separated, said spirals being brought together by the reverse oscillation. The inner casing $s$ is fixed to the spiral $f$ by the screw $t$, and carries with it the outer casing $u$, by means of the friction device $v$. Into this device the ribbon of solder is carried by a suitable guide $g$, bent edgewise and converted into a spiral grooved uniformly in cross section from the center outward, which spiral, as it comes from the machine, is, by the knife $h$, cut into a ring 2 forming substantially a circle. The ring thus formed is placed in a suitable die 1 and the can cap 3 placed upon the ring and the outer edge folded by the pressure of the die over the edge of the cap, see Fig. 6, forming the complete article, namely, a solder hemmed cap as shown in Fig. 10.

The process may be varied by casting the ribbon upon a wheel $c'$ and provided with a groove, of the proper curvature, $k$, in its periphery, said wheel being shown in cross section in Fig. 2, thus lessening the friction when the ribbon is introduced into the device shown in Fig. 5. The plain ribbon or the curved ribbon of solder may, if desired, be passed through a device for removing irregularities to make the ribbon of uniform thickness and width. Such a device is shown in Figs. 3 and 4, and this device consists of a guide $z$ whereby a ribbon or strip of solder may be introduced through an opening W, by means of which any irregularity of the edge may be removed and a strip produced of practically uniform thickness and width. The opening W may be circular in case the wheel shown in Fig. 2 is used, or rectangular in case the wheel shown in Fig. 1 is used. The strip is drawn through the opening W by means of the spool $x$, from which it is fed into the spiraling mechanism shown in Fig. 5.

The process may be further varied in that instead of forming in the spiraling mechanism a spiral grooved in cross section, a spiral rectangular in cross section may be produced from which a flat split ring, such as shown in Fig. 9, is produced. A portion of such a mechanism is shown in Fig. 11. The flat split ring thus produced may be hemmed upon the cap by means of the die shown in Fig. 6, or if desired this flat ring may be converted into a ring curved in cross section from the center outwardly by means of said dies.

The variations of the process do not essentially change it, the essential features being the production of the ribbon or wire of solder and the forming of a split curved ring.

I claim:—

1. The herein described process, which consists of producing a strip or ribbon of solder, bending the same edgewise into a ring, severing a ring from the remainder of the strip or ribbon and grooving said ring, substantially as described.

2. The herein described process, which consists of producing a strip or ribbon of solder, forming the same into a split ring and curving said ring from the center outwardly for the reception of a can cap, substantially as described.

3. The herein described process of preparing the solder rings, which consists in making a strip of solder, bending the same edgewise into a spiral, and forming from said spiral solder rings grooved in cross section from the center outwardly, substantially as described.

4. The process of making solder rings, which consists in producing a strip of solder, bending the same into the form of a ring, cutting the ring thus formed from the strip and grooving or curving said ring from the center outwardly for the reception of a can cap, substantially as described.

5. The process of preparing solder rings, which consists in making a ribbon or strip of solder of the requisite uniform size, converting the same into a spiral, severing rings therefrom, and grooving or curving said rings in cross section from the center outwardly, substantially as described.

6. The process of preparing solder rings, which consists in making a ribbon or strip of solder of the requisite uniform size, bending the same edgewise into a spiral, severing rings therefrom and grooving or curving said rings, substantially as described.

7. The herein described process, which consists in forming a flat ribbon of solder, bending the same edgewise into a split ring and transversely curving the same, thereby forming a grooved split solder ring of uniform thickness, substantially as described.

8. The herein described process, which consists in forming a spiral of ribbon solder, uniform in cross section, cutting therefrom a split ring, and transversely curving said ring, substantially as described.

9. The herein described process which consists in converting a strip of solder into a spiral form, severing said strip to form rings and transversely curving said rings, substantially as described.

10. The herein described process which consists in forming a flat ribbon of solder of substantially uniform thickness and width, converting said ribbon into a spiral, severing said spiral to form rings, and grooving said rings transversely, substantially as described.

11. The herein described process which consists in casting a ribbon or strip of solder, trimming off the irregularities thereof, forming a flat ribbon or strip of solder of substantially uniform thickness and width, converting the same into a spiral, severing rings from said spiral and grooving said rings transversely, substantially as described.

In testimony whereof, I affix my signature, in presence of two witnesses.

EDWARD M. LANG, Jr.

Witnesses:
   Geo. E. Brid,
   A. C. Berry.